United States Patent [19]
Zehnpfennig et al.

[11] Patent Number: 5,793,483
[45] Date of Patent: Aug. 11, 1998

[54] OPTICAL MEASUREMENT SYSTEM

[75] Inventors: Theodore F. Zehnpfennig, Acton; Geert Wyntjes, Chelsea, both of Mass.

[73] Assignee: Visidyne, Inc., Burlington, Mass.

[21] Appl. No.: 597,954

[22] Filed: Feb. 7, 1996

[51] Int. Cl.[6] .................... G01C 3/08; G01B 11/26
[52] U.S. Cl. .................... 356/139.03; 356/4.01; 356/5.11
[58] Field of Search ............ 356/139.03, 5.11, 356/4.01

[56] References Cited

U.S. PATENT DOCUMENTS

| | | | |
|---|---|---|---|
| 4,003,659 | 1/1977 | Conard et al. | 356/139.03 |
| 4,171,907 | 10/1979 | Hill et al. | 356/5.11 |
| 4,691,446 | 9/1987 | Pitches et al. | 356/139.03 |
| 4,709,580 | 12/1987 | Butts et al. | 356/139.03 |
| 4,964,722 | 10/1990 | Schumacher | 356/139.03 |
| 5,367,373 | 11/1994 | Busch-Vishniac et al. | 356/139.03 |

*Primary Examiner*—Stephen C. Buczinski
*Attorney, Agent, or Firm*—Iandiorio & Teska

[57] ABSTRACT

An optical measurement system includes: at least one optical beam transmitter; at least one optical beam detector for receiving the optical beam from the transmitter; modulation means for modulating the intensity of the transmitted optical beam; processor means for detecting the fractional and integer phase difference between the intensity modulation of the transmitted beam and the beam received by the receiver; and a calculator device for converting the integer and fractional phase difference into a distance between the transmitter and detector.

33 Claims, 7 Drawing Sheets

OPTICAL MEASUREMENT SYSTEM

FIELD OF INVENTION

This invention relates to an optical measurement system, and more particularly to such a system which is capable of determining the position and orientation of an object in three dimensional space.

BACKGROUND OF INVENTION

The Global Positioning System (GPS) consists of about two dozen satellites in earth orbit which transmit microwave signals to individual receivers affixed to objects on or near the ground to determine the positions of these objects. Typically, three to five satellites are visible at any given time and location and this number is sufficient for three dimensional position measurements. Microwave transmitters are very expensive, however, as microwave beams cannot be efficiently generated by inexpensive components. Moreover, microwave transmitters are typically large and heavy.

There are many applications in which precision three dimensional position measurements of objects are required. These applications include helmet tracking, in-flight simulators, heads-up displays, instructional and training systems, and virtual reality systems. Other applications include measurement of features on large structures such as ships and aircraft, vibration monitoring of buildings and bridges, machine tool and robotic control, and indoor navigation for laboratories, hospitals, and warehouses. An additional application is the precision measurement of the positions and orientations of probe assemblies on coordinate measurement machines, which are used to verify the accuracy of precise mechanical parts during the manufacturing process. However, the GPS does not provide the precision which is necessary in many of these smaller scale, and even large scale, applications. Moreover, in many of these applications, the GPS would not be operable because of multi-path effects in which the microwave beams would reflect off metal structures found in the areas surrounding the objects to be located so that the incoming beam would not properly be received. In particular, microwaves from GPS satellites are subject to shielding and multi-path effects due to the metal structures of buildings which restricts the use of the GPS in many cases to outdoor applications.

SUMMARY OF INVENTION

It is therefore an object of this invention to provide an improved optical measurement system.

It is a further object of this invention to provide such an optical measurement system which yields higher levels of accuracy and resolution for distance measurements.

It is a further object of this invention to provide such an optical measurement system which is capable of rapidly determining the position and orientation of an object in three dimensional space in all six degrees of freedom.

It is a further object of this invention to provide such an optical measurement system which does not require the use of microwave beams.

It is a further object of this invention to provide such an optical measurement system which is relatively compact.

It is a further object of this invention to provide such an optical measurement system which utilizes relatively inexpensive standard components.

It is a further object of this invention to provide such an optical measurement system which may be used in large scale applications, but which is well suited for small scale applications involving more local or limited distant scales.

This invention results from the realization that a truly reliable, low cost measurement system can be achieved by using one or more optical transmitters to transmit intensity modulated visible or infrared optical beams to one or more receivers, detecting the fractional and the integer phase difference between the intensity modulation of each transmitted and received beam, and converting the detected fractional and integer phase difference into the distance between each transmitter and receiver.

This invention features an optical measurement system. The system comprises at least one optical beam transmitter and at least one optical beam detector for receiving the optical beam from the transmitter. There are modulation means for modulating the intensity of the transmitted optical beam and there are processor means for detecting the fractional and integer phase difference between the intensity modulation of the transmitted beam and the beam received by the detector. There is a calculator device for converting the integer and fractional phase difference into a distance between the transmitter and detector.

In a preferred embodiment there may be at least one transmitter and one detector for measuring distance in one dimension. There may be at least one of the transmitter and detector and two of the other. The one of the transmitter and detector may be located on an object and the others may be located at known positions and there may further be included means, responsive to the calculator device, for resolving the position of the object in two dimensions. There may be at least one of the transmitter and detector and three of the other. The one of the transmitter and detector may be located on an object and the others may be located at known positions and there may further be included means, responsive to the calculator device, for resolving the position of the object in three dimensions. There may be at least two of the transmitters and detectors and three of the other. The two of the transmitters and detectors may be located on an object and the others may be located at known positions and there may further be included means, responsive to the calculator device, for resolving the position and orientation of the object in five dimensions. There may be at least three transmitters and three detectors. The three of the transmitters and detectors may be located on an object and the others may be located at known positions and there may further be included means, responsive to the calculator device, for resolving the position and orientation of the object in six dimensions. The detector may include a detector circuit and a remote target intermediate the transmitter and detector for reflecting the beam from the transmitter to the detector circuit. There may be at least one transmitter and one detector for measuring distance in one dimension. There may be at least one transmitter and detector and two of the other. One of the transmitter and detector may be located on an object and the others may be located at known positions and there may further be included means, responsive to the calculator device, for resolving the position of the object in two dimensions. There may be at least one transmitter and detector and three of the other. One of the transmitter and detector may be located on an object and the others may be located at known positions and there may further be included means, responsive to the calculator device, for resolving the position of the object in three dimensions. There may be at least two transmitters and detectors and three of the other. Two of the transmitters and detectors may be located on an object and the others may be located at known positions and there may further be included means, responsive to the calculator device, for resolving the position and orientation of the object in five dimensions. There may be at least three transmitters and three detectors. Three of the transmitters and detectors may be located on an object and the others may be located at known positions and there may further be included means, responsive to the calculator device, for resolving the position and orientation of the object in six dimensions. The modulation means may modulate the beam intensity sinusoidally. The modulation means may modulate the beam in the range from 10 MHz to 40 GHz. The calculator device may include means for multiplying the intensity modulation wavelength, $\Lambda$, and the detected integer and fractional phase difference to obtain the distance between the at least one transmitter and the at least one detector. There may be at least two transmitters, each one modulated at a different frequency, and the processor means may include a detector circuit responsive to the two different frequencies for separately resolving the integer and fractional phase difference of the transmitted and received beams. Each transmitter may emit a beam of a different wavelength and the processor means may include means for separately detecting the different wavelength beams. Each transmitter may emit a beam having a different polarization of the beam, and the processor means may include means for resolving the different polarizations of the beam. There may be at least two transmitters and there may further be included switch means, for sequentially activating the transmitters for temporarily encoding the transmitted beams.

This invention further features an optical measurement system which includes three optical beam transmitters on one of an object and at predetermined locations. There are three optical beam detectors on the other of the object and the predetermined locations for receiving the optical beams from the transmitters. There are modulation means for modulating the intensity of the transmitted optical beams. There are processor means for detecting the fractional and integer phase difference between the intensity modulation of the transmitted beams and the beams received by each detector. There is a calculator device for converting the integer and fractional phase differences into distances between each transmitter and each detector. There are means, responsive to the calculated distances, for determining the position and orientation of the object.

DISCLOSURE OF PREFERRED EMBODIMENT

Other objects, features and advantages will occur to those skilled in the art from the following description of a preferred embodiment and the accompanying drawings, in which.

Figure 1:
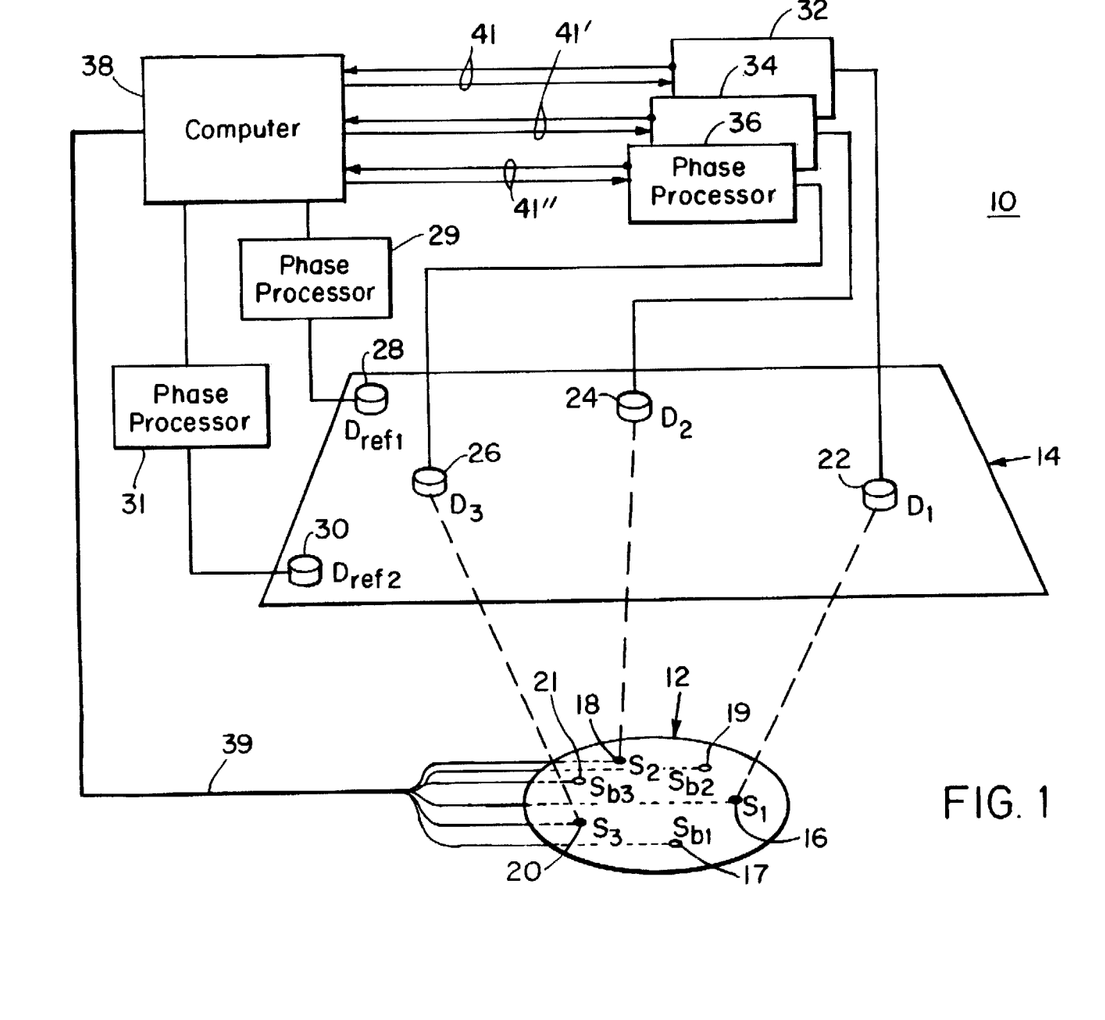
FIG. 1 is a schematic diagram of an optical measurement system according to this invention.

In FIG. 1 there is shown optical measurement system 10 which includes an object 12 whose position and orientation are desired to be known, and a metrology frame 14 against which the measurements from system 10 to object 12 are referenced. Object 12 includes primary sources $S_1$ 16, $S_2$ 18 and $S_3$ 20 which are typically laser diode transmitters that are modulated sinusoidally at different frequencies in the range from 10 MHz to 40 GHz. Frequency encoding is used here to distinguish the signal of one transmitter from those of the others. Encoding/decoding methods other than frequency encoding are certainly possible, and several alternative methods are discussed below. Object 12 also includes backup sources $S_{b1}$ 17, $S_{b2}$ 19 and $S_{b3}$ 21 to be utilized in case of any interruption in transmission from primary sources $S_1$ 16, $S_2$ 18 and/or $S_3$ 20. These sources may be battery-powered to eliminate trailing power cables, and their modulation frequencies are controlled by an on-board quartz crystal oscillator.

Metrology frame 14 includes detectors, $D_1$ 22, $D_2$ 24 and $D_3$ 26, mounted at known locations, which each receive signals transmitted from each source on object 12. The detectors are typically PIN diodes. Metrology frame 14 can be mounted in virtually any environment in which there is an object whose position and/or orientation are desired to be known. Also, it is not necessary to use a separate metrology frame, as the detectors could be individually mounted to existing structures in the environment where the object is located. Detectors $D_1$ 22, $D_2$ 24 and $D_3$ 26 are used to detect the modulated signals from sources $S_1$ 16, $S_2$ 18, and $S_3$ 20. The phases of the signals detected relative to the phases of the transmitted signals are monitored continuously to determine the ranges between each source and detector pair. These ranges are then used, as described below, to compute the instantaneous position and orientation of object 12.

There are two reference detectors, $D_{ref1}$ 28 and $D_{ref2}$ 30, mounted on metrology frame 14 which also receive the transmitted signals from the sources to provide redundancy in situations when one or more of the other detectors may fail and/or when some of the sources are not visible from some of the detectors.

The number of sources (and back-up sources), detectors and reference detectors described herein with regard to the preferred embodiment are typical but not definitive. Various numbers of sources and detectors may be utilized.

Optical signals received by detectors $D_1$ 22, $D_2$ 24 and $D_3$ 26 are converted to electrical signals and supplied to phase processors 32, 34 and 36, where phase information (i.e. the phase differences between each source and detector) related to the distances or ranges between the detectors and sources is determined and used by computer 38 to calculate these ranges. Each range R is calculated using the relationship $R=\Lambda(\Delta\phi+N)$, where $\Delta\phi$ is the fractional phase difference and N is the integer phase difference between each transmitter (source) and receiver (detector) and the $\Lambda$ is the wavelength of the intensity modulation. The basic unit of wavelength measurement used is not the wavelength $\lambda$ of the electromagnetic radiation produced by the source, but rather it is the longer wavelength, $\Lambda$, corresponding to the intensity modulation of the source which is produced by periodic and typically sinusoidal variations of the power supply which drives the source. The electromagnetic wavelength $\lambda$ produced by available laser diodes is typically in the range from 600 to 2000 nanometers. The modulation wavelength $\Lambda$ is typically larger than $\lambda$ by a factor of between $10^5$ to $10^6$. Because of this, the present invention is not susceptible to minor disturbances such as vibration, turbulence, and airborne dust.

Although the units of $\Delta\phi$ could be degrees or radians, here it will be defined in units of $\Lambda$. Thus, when $\Delta\phi=1.00$, the phase difference between the transmitted and received signals is equal to one modulation wavelength $\Lambda$. The phase processors provide to computer 38 the fractional phase information $\Delta\phi$ which enables computer 38 to calculate the integer phase differences and the total phase differences (integer and fractional) to determine the distances (ranges) between each source and detector using the relationship range $R=\Lambda(\Delta\phi+N)$. Using the calculated set of detector-to-source ranges, computer 38 then determines the state vector components corresponding to the six degrees of freedom of object 12, i.e. the position of object 12 in the three translational axes, X, Y and Z, and the angular position of object 12 about the X, Y and Z axes, which are also known as the pitch, yaw and roll components. These calculations are performed by means of equations 2–9, respectively, described below.

Computer 38, over line 39, controls the modulation frequency of the sources. Lines 41, 41', 41" provide signals to the phase processors to ensure that the received signals are properly demodulated depending on the modulation frequency of the sources.

Figure 1A:
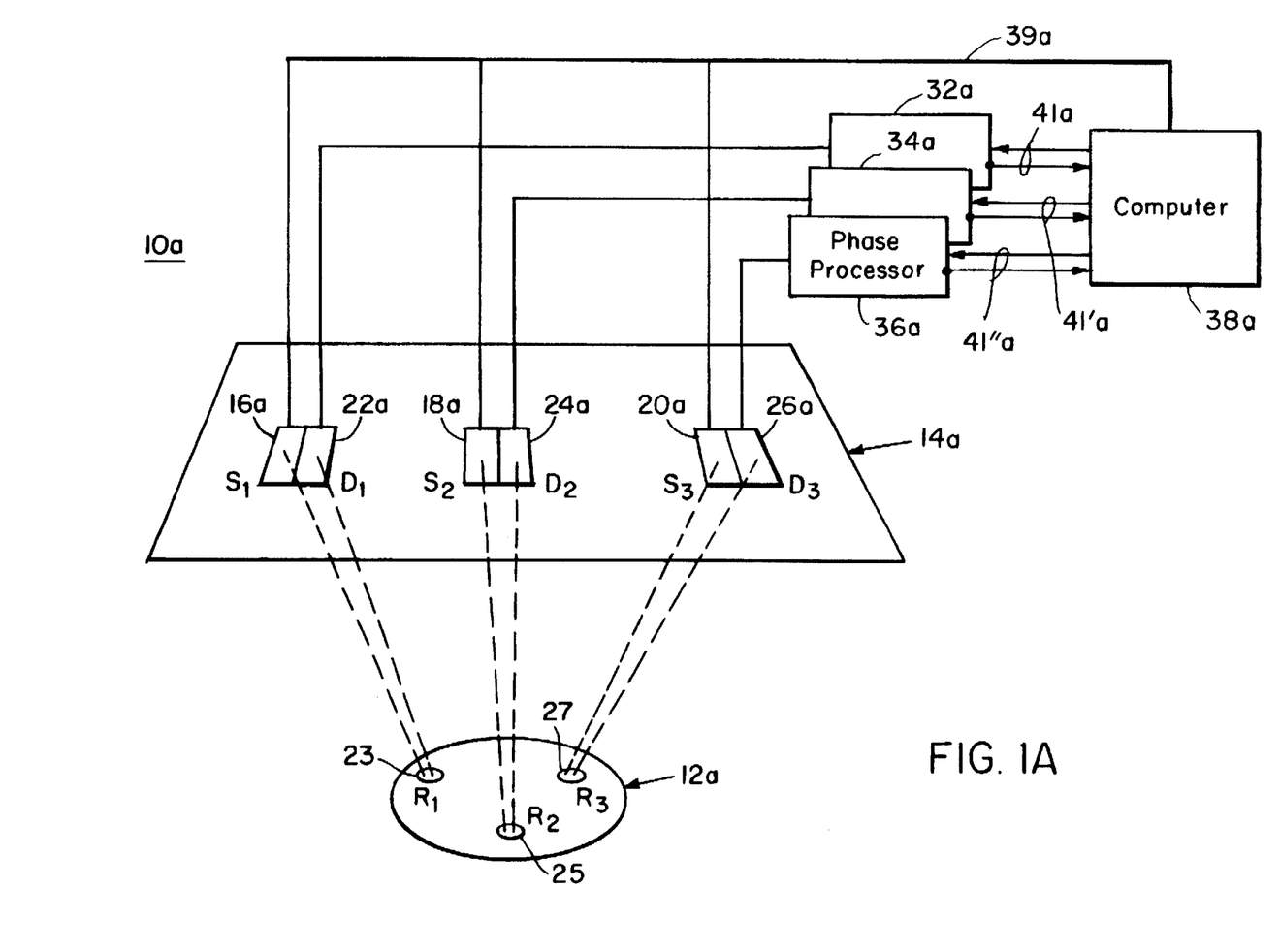
FIG. 1A is a schematic diagram of an alternative embodiment of the optical measurement system of FIG. 1.

An alternative embodiment optical measurement system 10a, FIG. 1A, includes each of the sources $S_1$ 16a, $S_2$ 18a, and $S_3$ 20a as well as each of the detectors $D_1$ 22a, $D_2$ 24a, and $D_3$ 26a all mounted on metrology frame 14a. Retro-reflectors $R_1$ 23, $R_2$ 25 and $R_3$ 27 are mounted at known locations on object 12a. The retro-reflectors can be any of a variety of types of optical devices which direct electromagnetic radiation back in the direction from which it arrived. These include cube corner prisms, arrays of such prisms, retro-reflecting spheres, and arrays of such spheres.

Optical signals from each of the sources are reflected off of each of the retro-reflectors and received by the detectors. The detectors then convert the received optical signals to electrical signals and transfer the electrical signals to phase processors 32a, 34a and 36a. The phase processors provide computer 38a with the phase information, $\Delta\phi$. Computer 38a calculates the total phase differences $\Delta\phi+N$ and then determines the distances between each of the sources and the retro-reflectors using the relationship $R=\Lambda(\Delta\phi+N)/2$, where division by 2 is required because radiation now traverses the range R twice. From this distance (range) information, the location and orientation of object 12a can be determined by use of equations 2–9 below.

A useful feature of the configuration shown in FIG. 1A is that the measurement components mounted on object 12a are completely passive retro-reflectors and require no power source or trailing cables. This will be advantageous in applications such as helmet tracking in virtual reality systems. It will be obvious to those skilled in the art, however, that the configuration of FIG. 1A could be reversed with the retro-reflectors on the metrology frame, and the transmitters and detectors on object 12a as shown in FIG. 1B.

Figure 1B:
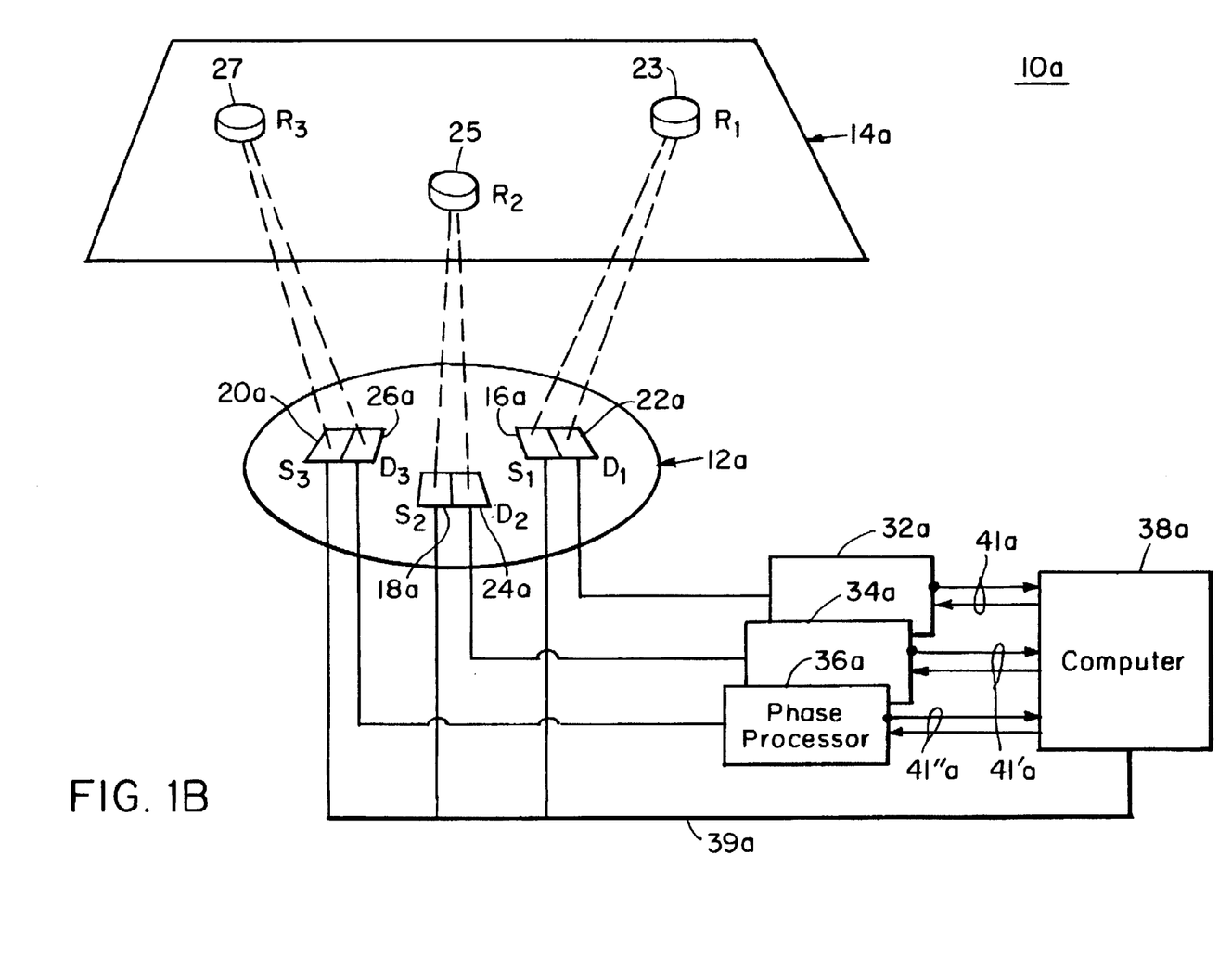
FIG. 1B is a schematic diagram of an alternative embodiment of the optical measurement system of FIG. 1A.

From the determined distances or ranges between each source and detector, the position and orientation of object 12, FIG. 1, or object 12a, FIGS. 1A and 1B, can be determined in six degrees of freedom. Where this is desired, three transmitters and three receivers must be utilized and distance measurements must be made between each transmitter and each receiver. If, however, less information is required about the position and orientation of object 12 (or 12a), fewer sources and/or detectors can be utilized. If measurement in only one translational dimension is required, then there need be only one transmitter and one receiver. If measurement in two translational dimensions is required, then there must be at least one transmitter and two receivers or one receiver and two transmitters. With at least one transmitter and three receivers or one receiver and three transmitters, measurement and position in three translational dimensions may be accomplished. And, if position and orientation in five dimensions is required, then there must be at least two transmitters or receivers and three of the other.

With multiple sources, some type of encoding method is required to distinguish the signal transmitted from one source from those transmitted by other sources. As discussed above, a preferred method accomplishes the encoding by operating each source at a slightly different modulation frequency. Then, the sources can be demodulated accordingly by each detector to determine the range between each different source and each detector. Alternatively, the encoding could be accomplished by transmitting radiation from each source in a different spectral bandpass (spectral encoding) and the detectors could cycle through the bandpasses in a temporal sequence. Or, the transmitters could emit beams having different polarizations to accomplish the encoding; however, this method is limited to use of only two transmitters. These different encoding/decoding methods are discussed below.

Figure 2:
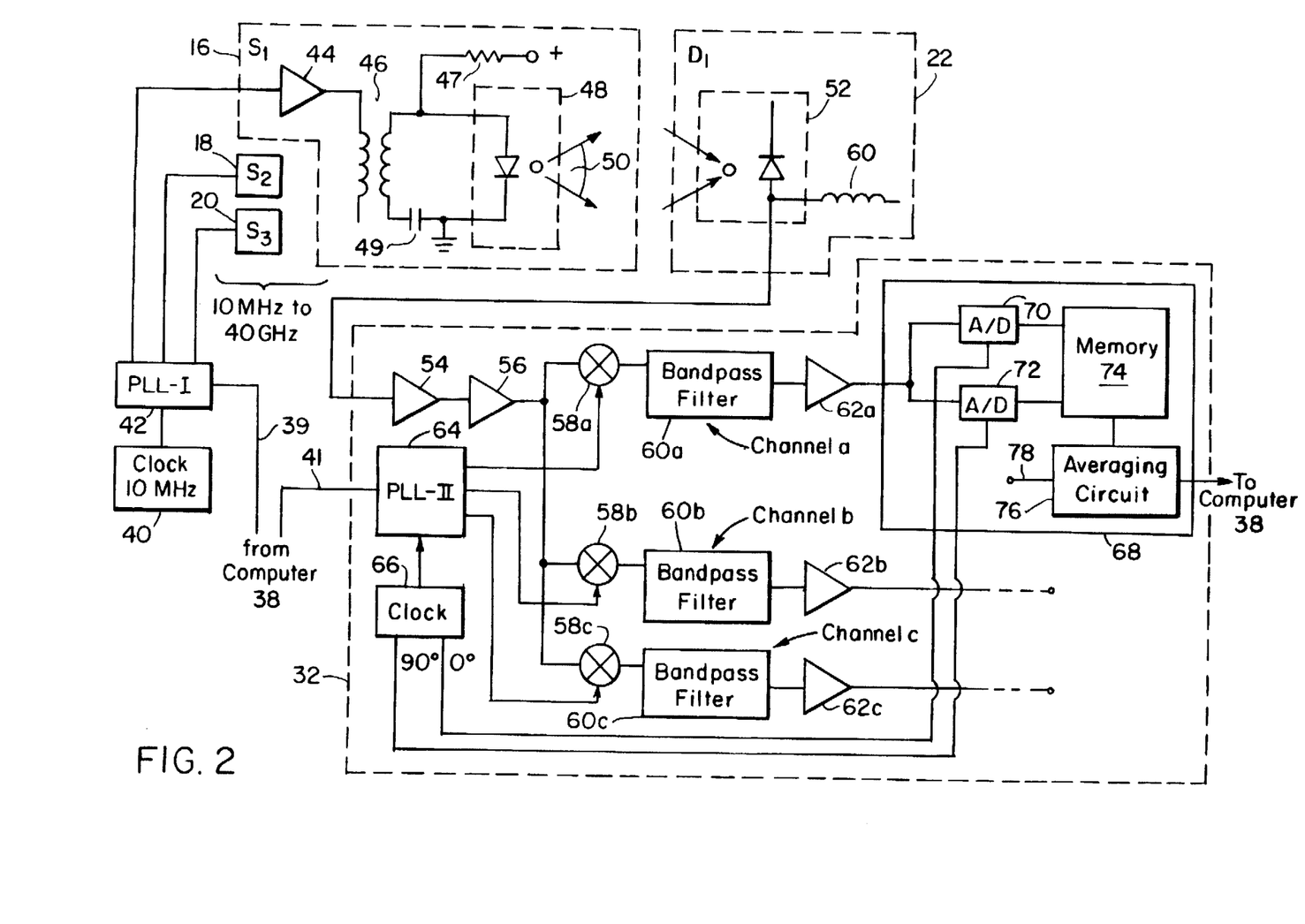
FIG. 2 is a detailed schematic diagram of the optical measurement system of FIG. 1.

Source $S_1$ 16 and phase processor 32, FIG. 1, configured with an encoding/decoding method whereby each source is modulated at a different modulation frequency, are shown in more detail in FIG. 2. Although sources $S_2$ 18 and $S_3$ 20 are indicated, they are not shown in full detail as they are configured in the same manner as source $S_1$ 16. Moreover, detectors $D_2$ 24 and $D_3$ 26 (not shown) are configured in the same manner as detector $D_1$ 22 and phase processors 34 and 36 (not shown) are configured in the same manner as phase processor 32.

Source $S_1$ 16 is modulated by frequency synthesizer 42 driven by source clock 40, operating at, for example, 10 MHz. The modulation frequencies of the sources are controlled by computer 38, FIG. 1, by adjusting the output of frequency synthesizer 42 with control signals over line 39. As an example, frequency synthesizer 42 supplies a modulation signal at 1.00 GHz, one hundred times the clock signal, to driver 44 of source $S_1$ 16. Simultaneously, frequency synthesizer 42 supplies to a driver (not shown) in source $S_2$ 18 a modulation signal at 1.01 GHz, and to a driver (also not shown) in source $S_3$ 20 a modulation signal at 1.02 GHz. These modulation frequencies are only exemplary, as the modulation frequencies may range from 10 MHz to 40 GHz.

The modulation signal from driver 44 is then passed to transformer 46 which matches the impedance and voltage requirements of light source 48, such as a laser diode or light emitting diode, which outputs an optical signal or beam 50 modulated at the modulation frequency. Also included in source $S_1$ 16 are capacitor 49 and resistor 47 to allow the required forward bias to be applied to the source. Sources $S_2$ 18 and $S_3$ 20 are similarly configured and also output optical signals modulated, however, at slightly different frequencies.

Optical signal 50 from source $S_1$ 16 is divergent and is received by each detector ($D_1$ 22, $D_2$ 24 and $D_3$ 26). However, in this configuration, reception of optical signal 50 is only depicted with regard to detector $D_1$ 22 and its corresponding phase processor 32. It should be noted, however, that the operation of detectors $D_2$ 24 and $D_3$ 26 and their corresponding phase processors 34 and 36 is the same. Moreover, with regard to FIG. 2, detector $D_1$ 22 and phase processor 32 are capable of processing optical signals transmitted from all three sources, however the processing of only optical signal 50 from source $S_1$ 16 is depicted in this figure.

Optical signal 50 is received by detector $D_1$ 22 which includes photodiode 52 and inductor 60. The received signal is introduced to low noise preamplifier 54 and radio frequency amplifier 56 and finally it is provided to channels a, b and c, which correspond to sources $S_1$ 16, $S_2$ 18 and $S_3$ 20, respectively. Channel a includes mixer 58a, bandpass filter 60a, which has a 10 MHz center frequency and typically a 100 KHz bandwidth, and intermediate frequency amplifier 62a. Channels b and c include corresponding components labeled with the same reference numerals accompanied by the letters b and c, respectively. Frequency synthesizer 64 also supplies signals to mixers 58a-c. Frequency synthesizer 64 is driven by clock 66 operating at 10 MHz, for example, which may be synchronized with source clock 40 by a cross-calibration procedure. In this example, frequency synthesizer 64 supplies mixer 58a with a signal of 0.99 GHz so that when the signal from source $S_1$ 16 modulated at 1.00 GHz is mixed, its output is beaten down to 10 MHz which is allowed to pass through bandpass filter 60a for phase processing. Frequency synthesizer 64 provides mixer 58b with a 1.00 GHz signal which beats down the 1.01 GHz modulated signal from source $S_2$ 18 to 10 MHz so that it is allowed to pass through bandpass filter 60b for phase processing. Frequency synthesizer 64 provides mixer 58c with a 1.01 GHz signal which beats down the transmitted 1.02 GHz modulated signal from source $S_3$ 20 to 10 MHz which enables passage of the signal through bandpass filter 60c for phase processing. This demodulation scheme enables the separation of the optical signals transmitted from sources $S_1$ 16, $S_2$ 18 and $S_3$ 20. A signal over line 41 from computer 38 controls the output frequencies of frequency synthesizer 64 so that mixers 58a-c can properly demodulate the signals from the sources depending on the frequency at which the sources are modulated.

The output from intermediate frequency amplifier 62a is introduced to detector circuit 68 which includes two analog to digital converters 70 and 72. Both converters 70 and 72 receive at one input the signal from intermediate frequency amplifier 62a. The other input of analog to digital converter 70 receives the in-phase or 0° reference signal derived from clock 66, while analog-to-digital converter 72 receives the quadrature or 90° reference signal also derived from clock 66. Thus, the signal from intermediate frequency amplifier 62a is digitized and then demodulated by the in-phase and quadrature reference signals. These demodulated digital signals are input to memory device 74 that contains a look-up table addressed by the in-phase and quadrature digital reference signals. The number retrieved from the reference table is in the form of a ten (10) or greater bit digital word which corresponds to the fractional phase difference between the detected optical signal and the transmitted optical signal. Channels b and c contain similar components. The phase information from all of the channels can be used, as described below, to determine the position and orientation of object 12.

Averaging circuit 76 is used to average a certain number of fractional phase difference signals before providing an average fractional phase difference signal to computer 38. Set control 78 enablers the user to set the number of signals to be averaged.

Figure 3:
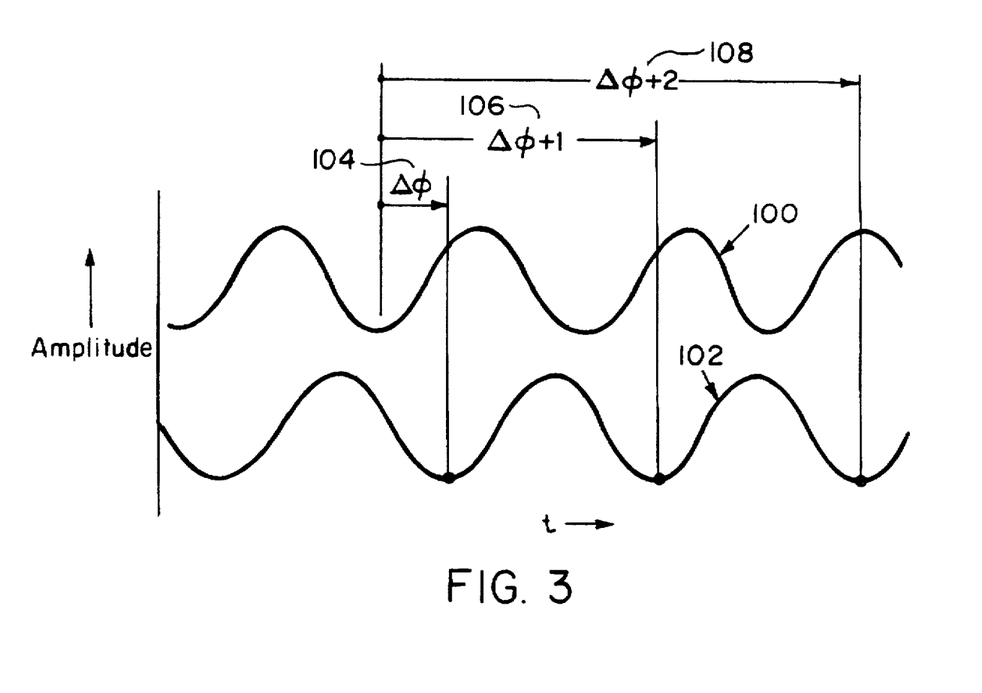
FIG. 3 is a plot of both the transmitted and received intensity modulated signals illustrating "integer cycle ambiguity"

The output of averaging circuit 76 is only the fractional phase difference and the number of full or integer cycles at that point is unknown. This "integer cycle ambiguity" is illustrated in FIG. 3, which shows the amplitude of the intensity modulated signal 100 from the source and the signal 102 from the detector as functions of time t. The apparent or fractional phase difference $\Delta\phi$(104), as shown, would indicate that the range from source to detector is equal to $\Lambda\phi\Lambda$. However, from the information contained in the two wave forms, the possibility that the true phase difference is $\Delta\phi+1$ (106), $\Delta\phi+2$ (108) . . . or $\Delta\phi+N$, where N is any integer number of cycles, can not be excluded. Thus, the true range could be $\Lambda(\Delta\phi+1)$, $\Lambda(\Delta\phi+2)$ . . . or $\Lambda(\Delta\phi+N)$ in addition to $\Lambda\Delta\phi$. This ambiguity can be resolved in any one of several ways.

The preferred way is to momentarily shift the frequency f of the intensity modulation of the source by a small amount $\Delta f$ typically 1% -2% of f under the control of computer 38 over line 39. This will cause the observed phase shift $\Delta\phi$ to change to a new value $\Delta\phi'$. The difference $\Delta\phi'-\Delta\phi$ is directly proportional to the true range, thus indicating the number of integer cycles N between source and detector. Specifically, N is calculated by computer 38 as follows:

$$N = INT\left(\frac{\Delta\phi' - \Delta\phi}{\Delta f/f}\right) \quad (1)$$

Here the notation "INT" indicates use of the integer value, found by calculating the numerical value of the quantity in parentheses and then truncating that value. Then, computer 38 sums the integer and fractional number of cycles ($\Delta\phi+N$) to determine the total phase difference.

Another way to resolve the ambiguity is to transmit and receive both frequencies f and $f+\Delta f$ simultaneously, rather than sequentially. The two frequencies are then separated in the detector electronics by band pass filters. The third way is to initially position object 12 in some standard calibration position which has a known value of N, and then track the changes in N during subsequent movements of object 12. The fourth way is to encode the transmitted signal with low frequency waveforms indicating the true range, using encoding techniques known to those skilled in the art.

Computer 38, FIG. 1, then uses the averaged fractional ($\Delta\phi$) and integer (N) phase differences indicative of the distances between sources $S_1$ 16, $S_2$ 18 and $S_3$ 20 and detector $D_1$ 22 as well as the averaged phase difference signals indicative of the distances between all three sources and the other two detectors to calculate the distances between each source and each detector. This is done by multiplying the wavelength, $\Lambda$, of the optical signals by the phase differences, $\Delta\phi+N$, (integer and fractional) between each source and each detector corresponding to the total number of cycles the beams have propagated from each source to each detector.

Once the ranges between each source and each detector are determined, the position and orientation calculations are then begun by computer 38. A first set of measured distances or ranges from, for example, source $S_1$ 16, to detectors $D_1$ 22, $D_2$ 24 and $D_3$ 26 are designated $R_{11}$, $R_{12}$ and $R_{13}$, respectively. Source $S_1$ 16 lies at the intersection of three spheres of radii $R_{11}$, $R_{12}$, and $R_{13}$ centered on detectors $D_1$ 22, $D_2$ 24 and $D_3$ 26, respectively. This gives three equations and three unknowns, $x_1$, $y_1$ and $z_1$ as follows:

$$(x_1-X_1)^2+(y_1-Y_1)^2+(z_1-Z_1)^2=R_{11}^2$$
$$(x_1-X_2)^2+(y_1-Y_2)^2+(z_1-Z_2)^2=R_{12}^2 \quad (2)$$

$$(x_1-X_3)^2+(y_1-Y_3)^2+(z_1-Z_3)^2=R_{13}^2$$

Here, $X_i$, $Y_i$ and $Z_i$ are the coordinates of the $I_{th}$ detector. These equations can be solved for the position $x_1$, $y_1$ and $z_1$ of source $S_1$ 16. When these equations and equations (3) and (6) below are solved, two solutions will be produced. One solution produced, however, can be excluded because it will not be within the known range of acceptable solutions for the position of each of the sources.

The position of source $S_1$ 16 is defined as the primary reference point on object 12. Since the coordinates $x_1$, $y_1$ and $z_1$ of this reference source have been found, three components of the state vector have now been measured.

Similarly the position $x_2$, $y_2$ and $z_2$ of a second source $S_2$ 18 on object 12 is computed by solving the following equations:

$$(x_2-X_1)^2+(y_2-Y_1)^2+(z_2-Z_1)^2=R_{21}^2$$

$$(x_2-X_2)^2+(y_2-Y_2)^2+(z_2-Z_2)^2=R_{22}^2 \quad (3)$$

$$(x_2-X_3)^2+(y_2-Y_3)^2+(z_2-Z_3)^2=R_{23}^2$$

From these positions of two sources on object 12, two additional components of the state 3vector, pitch and yaw, can be calculated as follows. First, a unit vector $\overline{V}_{12}$ is defined pointing from $S_1$ 16 to $S_2$ 18. Then, the pitch angle is defined to be the angle between the projection of this vector onto the X-Y plane and the X-axis, which is:

$$\text{Pitch} = \arctan \frac{y_2 - y_1}{x_2 - x_1} \quad (4)$$

Similarly, the yaw angle is defined to be the angle between the projection of $\overline{V}_{12}$ onto the X-Z plane and the X-axis, which is:

$$\text{Yaw} = \arctan \frac{z_2 - z_1}{x_2 - x_1} \quad (5)$$

The position $x_3$, $y_3$ and $z_3$ of the third source $S_3$ 20 is determined by solving the following equations:

$$(x_3-X_1)^2+(y_3-Y_1)^2+(z_3-Z_1)^2=R_{31}^2$$

$$(x_3-X_2)^2+(y_3-Y_2)^2+(z_3-Z_2)^2=R_{32}^2 \quad (6)$$

$$(x_3-X_3)^2+(y_3-Y_3)^2+(z_3-Z_3)^2=R_{33}^2$$

From this position, the final component, roll, can be computed as follows. Another unit vector $\overline{V}_{13}$ is defined to be pointing from $S_1$ 16 to $S_3$ 20, and a plane $P_{12}$ is established normal to the earlier vector $\overline{V}_{12}$. Roll is defined as the angle between the projections of $\overline{V}_{13}$ and the Y-axis onto plane $P_{12}$. The roll angle can be calculated from the following equations, in which $\overline{j}$ is a unit vector pointing in the y direction:

$$\overline{P} = \overline{V}_{13} - (\overline{V}_{12} \cdot \overline{V}_{13})\overline{V}_{12} \quad (7)$$

$$\overline{Q} = \overline{j} - (\overline{V}_{12} \cdot \overline{j})\overline{V}_{12} \quad (8)$$

$$\text{Roll} = \arccos \left( \frac{\overline{P} \cdot \overline{Q}}{|\overline{P}||\overline{Q}|} \right) \quad (9)$$

Here, $\overline{V}_{12} \cdot \overline{V}_{13}$ denotes the dot or scalar product of the two vectors $\overline{V}_{12}$ and $\overline{V}_{13}$ and $|\overline{P}|$ denotes the length of the vector $\overline{P}$. This completes the calculation of the state vector.

Typically, the state vector is updated at a rate of 60 Hz. Thus, according to the present invention, precise positional and orientational monitoring of objects can be accomplished in real time with inexpensive, available components. Translational and rotational velocities and accelerations can be computed from time derivatives of the state vector, as will be apparent to those skilled in the art.

Figure 4:
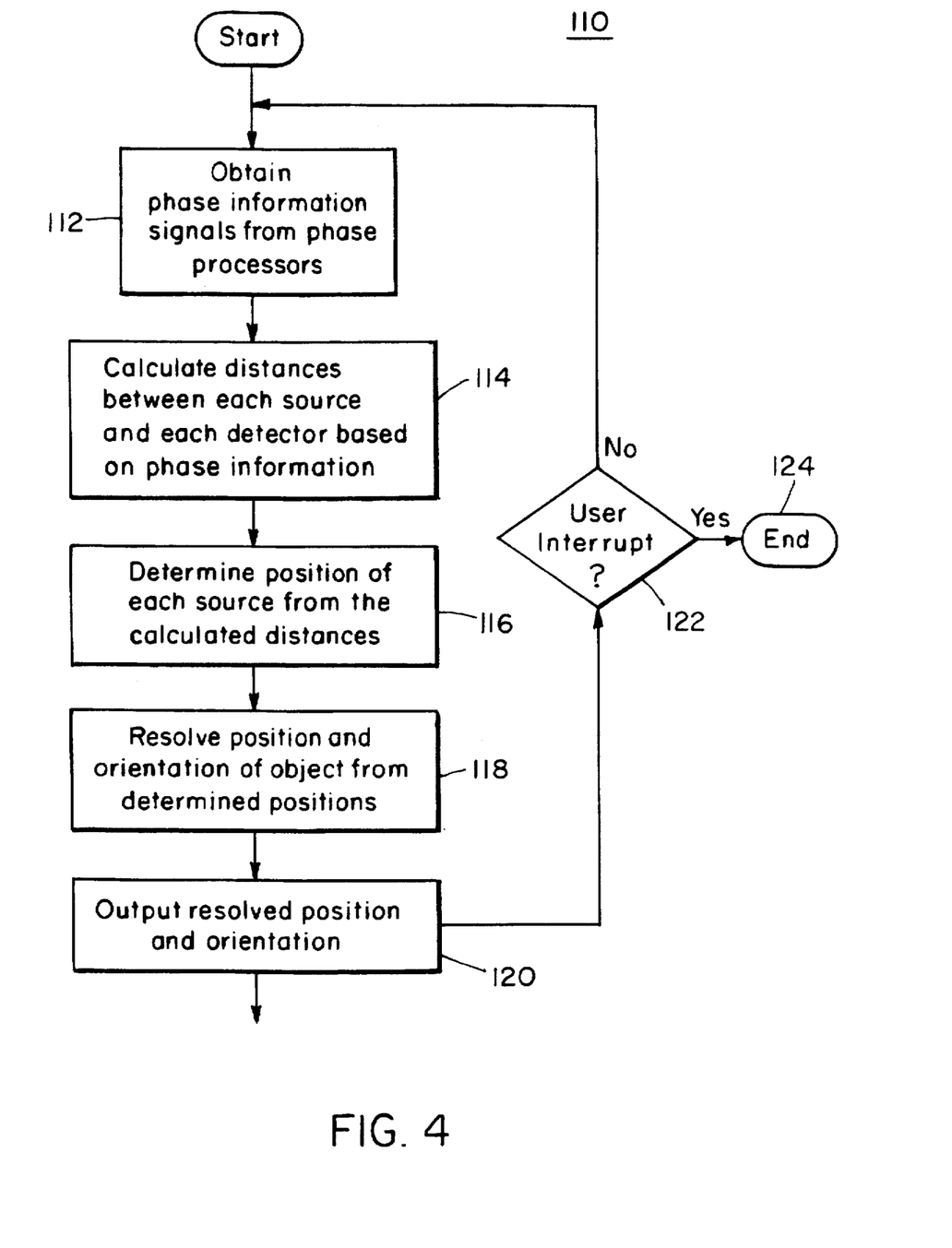
FIG. 4 is a flow chart of the software necessary to implement the optical measurement system according to this invention.

The software necessary to implement the distance measurement calculations from each source to each detector and the ultimately the position and orientation of object 12, FIG. 1, can be implemented according to flow chart 110 of FIG. 4.

Flow chart 110 begins with a start command which initiates the system to start obtaining phase information signals from the phase processors in step 112. At step 114 the system calculates the distances or ranges between each source and each detector based on the phase information obtained in step 112. The position of each source from the calculated distances is then determined in step 116 and the system resolves the position and orientation of object 12, FIG. 1, from the determined positions at step 118. Finally, the system outputs in step 120 the resolved position and orientation of object 12, FIG. 1. While the position and orientation are being output the system loops back to step 112 where the next set of phase information signals are obtained and the position and orientation resolution process is carried out again. This continues until a user interrupt is received at step 122, which causes the process to end at step 124.

The flow chart corresponding to other configurations such as are shown in FIGS. 1A and 1B would be similar to 110.

Figure 5:
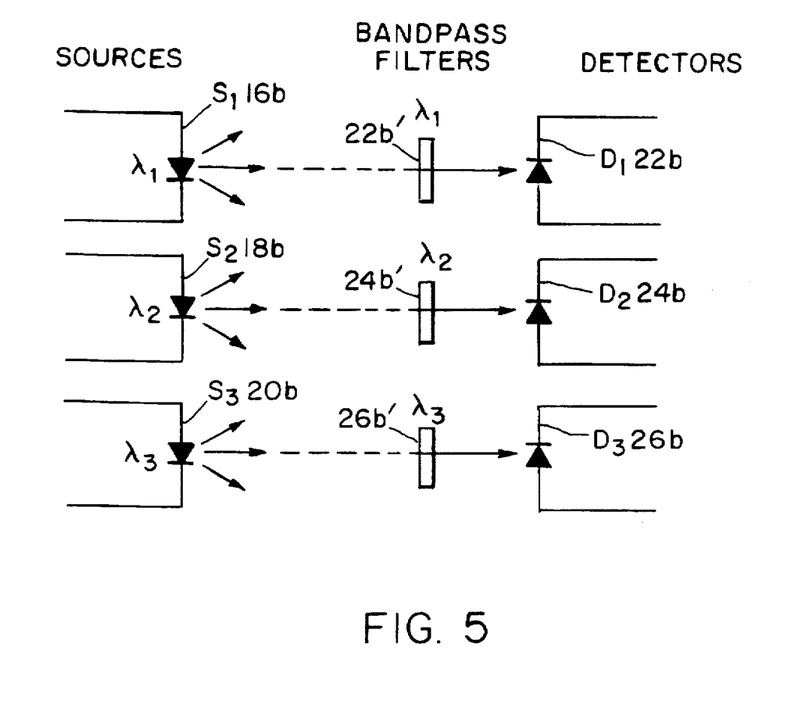
FIG. 5 is a schematic diagram of an alternative, spectral encoding scheme.
Figure 6:
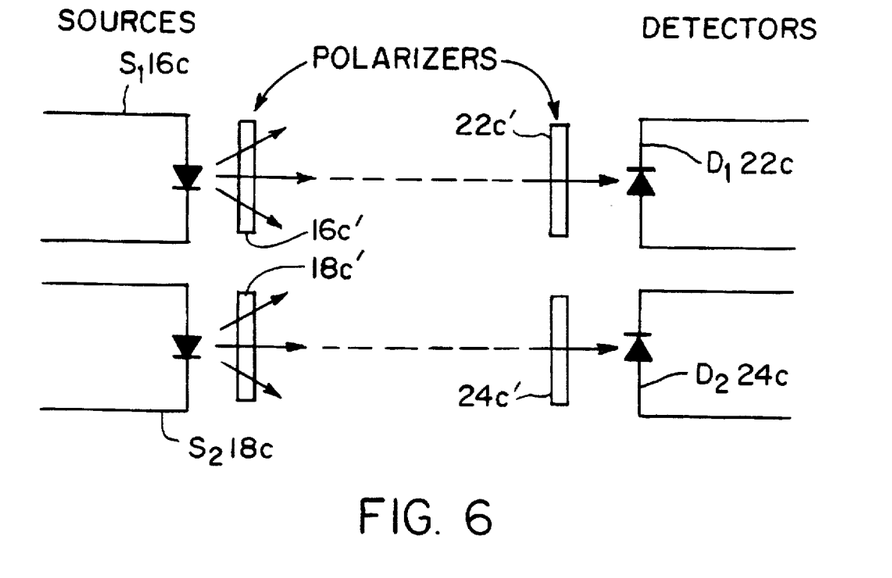
FIG. 6 is a schematic diagram of another alternative, polarization encoding scheme.
Figure 7:
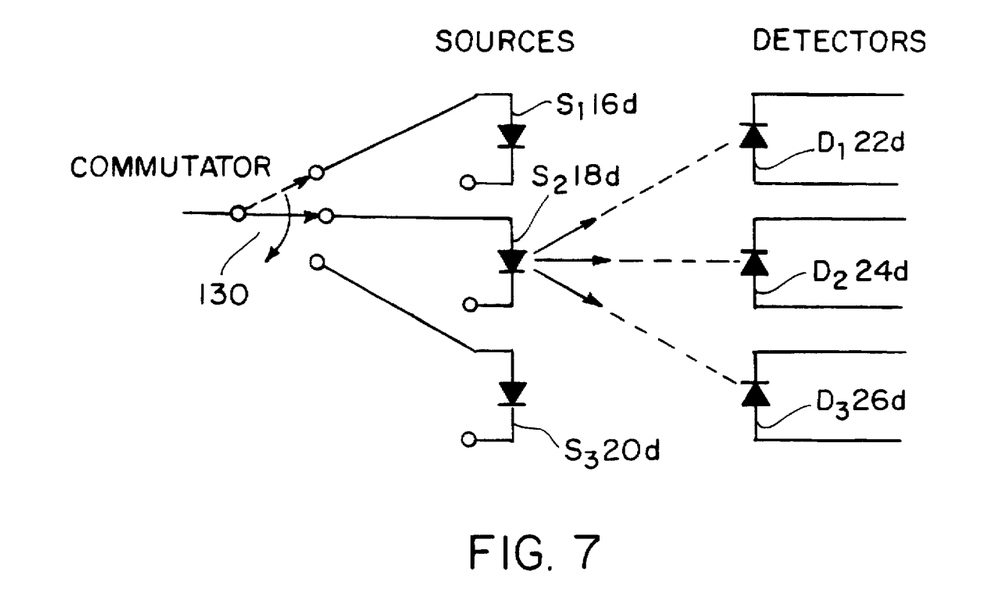
FIG. 7 is a schematic diagram of yet another alternative, temporal encoding scheme.

Alternatives to encoding by operating each of the sources at slightly different modulation frequencies are depicted in FIGS. 5–7.

The scheme of FIG. 5 uses spectral encoding. Laser diode sources $S_1$ 16b, $S_2$ 18b and $S_3$ 20b operate at different wavelengths $\lambda_1, \lambda_2, \lambda_3$ transmitting radiation to detectors $D_1$ 22b, $D_2$ 24b and $D_3$ 26b. Each detector is equipped with a bandpass filter 22b', 24b' and 26b', respectively, which allows only one of the source wavelengths to pass.

Polarization encoding is depicted in FIG. 6. Radiation from the sources $S_1$ 16c and $S_2$ 18c is linearly polarized by two polarizing filters 16c' and 18c', respectively, oriented to pass the two perpendicular polarizations. Two polarizers 22c' and 24' in front of the detectors $D_1$ 22c and $D_2$ 24c, respectively, allow only one of the polarizations to pass to each detector. Circular polarization may similarly be used as an encoding technique.

In FIG. 7 a temporal encoding scheme is depicted. A rotary switch or commutator 130 is used to turn on only one of the sources $S_1$ 16d, S2 18d or $S_3$ 20d at a given time. The source that is on is simultaneously received by detectors $D_1$ 22d, $D_2$ 24d and $D_3$ 26d.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. An optical measurement system comprising:
   at least one optical beam transmitter for transmitting at least one optical beam;
   at least two optical beam detectors remote from each said transmitter for receiving said optical beam from said transmitter;
   modulation means for modulating the intensity of said optical beam;
   frequency modulation means for modulating said optical beam transmitted by each said optical beam transmitter at a different frequency;

processor means for detecting the fractional and integer phase difference between the intensity modulation of the transmitted beam and the beam received by said detector; and a calculator device for converting the integer and fractional phase difference into a distance between said transmitter and detector; and means, responsive to said modulated frequency and said calculator device, for resolving the position and orientation of said object.

2. The optical measurement system of claim 1 in which one of said at least one transmitter is located on the object and said detectors are located at known positions and further including means, responsive to said calculator device, for resolving the position of said object in two dimensions.

3. The optical measurement system of claim 1 in which there are at least three said detectors.

4. The optical measurement system of claim 3 in which one of said at least one transmitter is located on the object and said detectors are located at known positions and further including means, responsive to said calculator device, for resolving the position of said object in two dimensions.

5. The optical measurement system of claim 1 in which there are at least two of each said transmitters and three said detectors.

6. The optical measurement system of claim 5 in which two of said transmitters are located on the object and said detectors are located at known positions and further including means, responsive to said calculator device, for resolving the position and orientation of said object in five dimensions.

7. The optical measurement system of claim 1 in which there are at least three transmitters and three said detectors.

8. The optical measurement system of claim 7 in which three of said transmitters are located on the object and said detectors are located at known positions and further including means, responsive to said calculator device, for resolving the position and orientation of said object in six dimensions.

9. The optical measurement system of claim 7 in which three of said detectors are located on the object and said transmitters are located at known positions and further including means, responsive to said calculator device, for resolving the position and orientation of said object in six dimensions.

10. The optical measurement system of claim 1 in which said detector includes a detector circuit and a remote target intermediate said transmitter and detector for reflecting the beam from said transmitter to said detector circuit.

11. The optical measurement system of claim 10 in which one of said at least one transmitter is located on the object and said detectors are located at known positions and further including means, responsive to said calculator device, for resolving the position of said object in two dimensions.

12. The optical measurement system of claim 10 in which there are at least three said detectors.

13. The optical measurement system of claim 12 in which one of said at least one transmitter is located on the object and said detectors are located at known positions and further including means, responsive to said calculator device, for resolving the position of said object in two dimensions.

14. The optical measurement system of claim 10 in which there are at least two of each transmitter and three said detectors.

15. The optical measurement system of claim 14 in which two of said transmitters are located on the object and said detectors are located at known positions and further including means, responsive to said calculator device, for resolving the position and orientation of said object in five dimensions.

16. The optical measurement system of claim 10 in which there are at least three transmitters and three said detectors.

17. The optical measurement system of claim 16 in which three of said transmitters are located on an object and said detectors are located at known positions and further including means, responsive to said calculator device, for resolving the position and orientation of said object in six dimensions.

18. The optical measurement system of claim 16 in which three of said detectors are located on the object and said transmitters are located at known positions and further including means, responsive to said calculator device, for resolving the position and orientation of said object in six dimensions.

19. The optical measurement system of claim 10 in which said detectors are located on the object and said at least one transmitter is located at a known position and further including means, responsive to said calculator device, for resolving the position of said object in two dimensions.

20. The optical measurement system of claim 10 in which there are at least three transmitters.

21. The optical measurement system of claim 20 in which two of said detectors are located on the object and said transmitters are located at known positions and further including means, responsive to said calculator device, for resolving the position and orientation of said object in five dimensions.

22. The optical measurement system of claim 1 in which said modulation means modulates said beam intensity sinusoidally.

23. The optical measurement system of claim 1 in which said modulation means modulates said beam in the range from 10 MHz to 40 GHz.

24. The optical measurement system of claim 1 in which said calculator device includes means for multiplying the intensity modulation wavelength, $\Lambda$, by the detected integer and fractional phase difference to obtain the distance between said at least one transmitter and said at least one receiver.

25. The optical measurement system of claim 1 in which said processor means includes a detector circuit responsive to said different frequencies for separately resolving the integer and fractional phase difference of the transmitted and received beams.

26. The optical measurement system of claim 1 in which there are at least three transmitters.

27. The optical measurement system of claim 26 in which two of said detectors are located on the object and said transmitters are located at known positions and further including means, responsive to said calculator device, for resolving the position and orientation of said object in five dimensions.

28. The optical measurement system of claim 1 in which there are at least two transmitters and there is further included switch means for sequentially activating said transmitters to temporally encode each said transmitted beam.

29. The optical measurement system of claim 1 in which said detectors are located on the object and said transmitters are located at known positions and further including means, responsive to said calculator device, for resolving the position of said object in two dimensions.

30. The optical measurement system of claim 1 in which there are a plurality of transmitters each said transmitter emits a beam of a different wavelength and said processor means includes means for separately detecting each said different wavelength beam.

31. The optical measurement system of claim 1 in which there are a plurality of transmitters each of said transmitter emits a beam having a different polarization of the beam and said processor means includes means for resolving each said different polarization of the beam.

32. An optical measurement system comprising:

three optical beam transmitters on an object;

three optical beam detectors at predetermined locations remote from said object for receiving said optical beams from said transmitters;

modulation means for modulating the intensity of the transmitted optical beams;

processor means for detecting the fractional and integer phase difference between the intensity modulation of the transmitted beams and the beams received by each detector;

a calculator device for converting the integer and fractional phase differences into distances between each transmitter and each detector; and means, responsive to said calculated distances, for determining the position and orientation of said object.

33. The optical measurement system of claim 32 further including frequency modulation means for modulating the frequency of said optical beam transmitted by each said optical beam transmitter at different frequencies.

* * * * *